Dec. 4, 1956  E. M. WILLIAMS  2,773,168
HIGH-SPEED SPARK MACHINING APPARATUS
Filed Jan. 22, 1953  2 Sheets-Sheet 1

INVENTOR.
EVERARD M. WILLIAMS by Carlson, Pitzner, Hubbard & Wolfe
ATTORNEYS

Dec. 4, 1956 E. M. WILLIAMS 2,773,168
HIGH-SPEED SPARK MACHINING APPARATUS
Filed Jan. 22, 1953 2 Sheets-Sheet 2
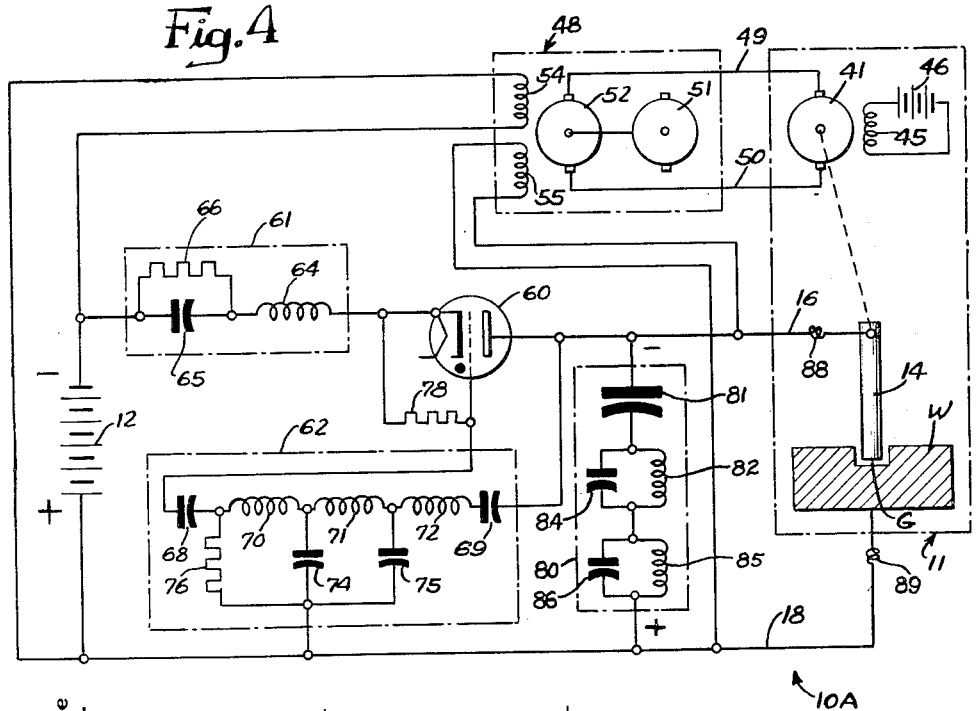
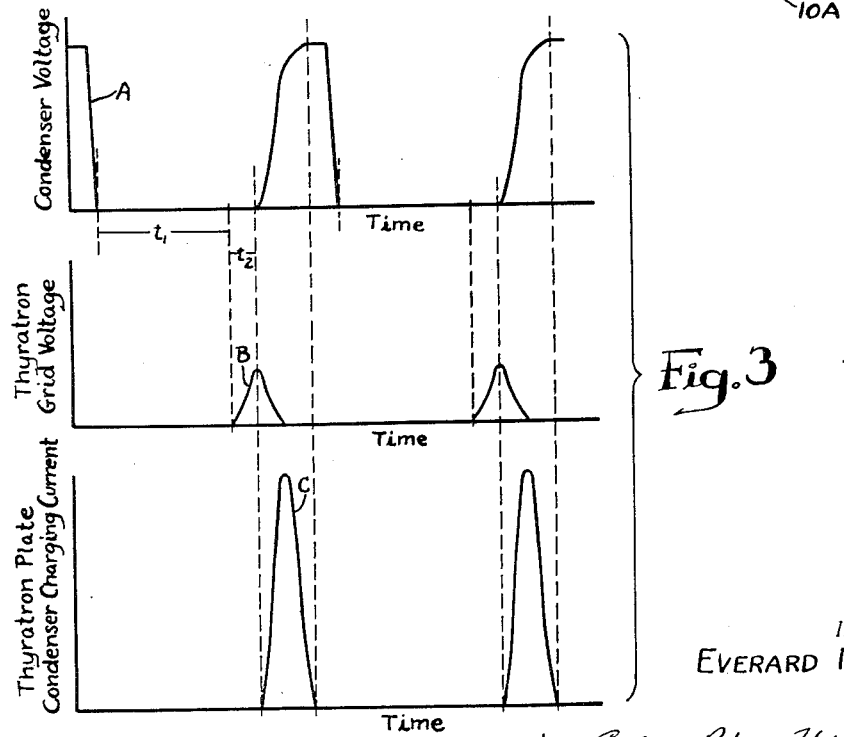
INVENTOR.
EVERARD M. WILLIAMS
by: Carlson, Pitzner, Hubbard + Wolfe
ATTORNEYS

United States Patent Office 2,773,168
Patented Dec. 4, 1956

2,773,168

HIGH-SPEED SPARK MACHINING APPARATUS

Everard M. Williams, Pittsburgh, Pa., assignor to Firth Sterling Inc., Pittsburgh, Pa., a corporation of Pennsylvania Application January 22, 1953, Serial No. 332,621

9 Claims. (Cl. 219—69)

This invention relates generally to the field of machining hard, conductive materials and, more particularly, to a novel high-speed apparatus for machining such materials by electrical dislodgment of particles therefrom.

U. S. Patent 2,650,979, issued September 1, 1953, upon application of E. E. Teubner, discloses a method and apparatus for machining contours of revolution and translation in sintered carbides and other hard, conductive materials by electrically dislodging particles of such materials. This is accomplished by the application of a series of time-spaced, electrical spark discharges across a spark gap between an electrode tool and a workpiece, the gap being filled with a dielectric medium. One simple form of such apparatus includes energy storage means in the form of a condenser continuously connected between the electrode tool and the workpiece and also to a charging circuit. After each discharge of the condenser, the charging circuit serves to recharge it. However, recharging at too high a rate tends to interfere with proper deionization in the spark gap and to produce an arc which is highly undesirable. To prevent formation of an arc, theerfore, the rate of recharging must be limited. Consequently, successive recharging and discharging of the condenser can occur only at a relatively low rate and this limits the machining speed attainable.

Accordingly, it is the general aim of the present invention to provide a novel high-speed spark machining apparatus capable of charging and discharging with substantially greater rapidity than apparatus of the type known heretofore.

A more specific object of the invention is to provide a spark machining apparatus of the character set forth and including an arrangement for isolating the energy storage means from the charging circuit pending discharge of the storage means and deionization of the spark gap.

A further object of the invention is to provide an apparatus of the foregoing type and wherein the energy storage means is adapted to deliver across the spark gap repetitive, uniform pulses of steep wave front and high amplitude, thereby intensifying the electrical discharges which dislodge material from the workpiece.

Still another object is to provide an apparatus of the character set forth in combination with an automatic feed for moving the electrode tool relative to the workpiece with a precisely regulated spark gap.

Other objects and advantages of the invention will become apparent from the detailed description to follow, taken together with the accompanying drawings, wherein:

Fig. 3 is a series of curves showing the instantaneous values of several circuit functions in the apparatus of Figs. 1 and 2 during a complete cycle of discharge and recharge.

Fig. 4 is a view similar to Fig. 2 but showing a modified form of apparatus also embodying the invention.

Figure 1:
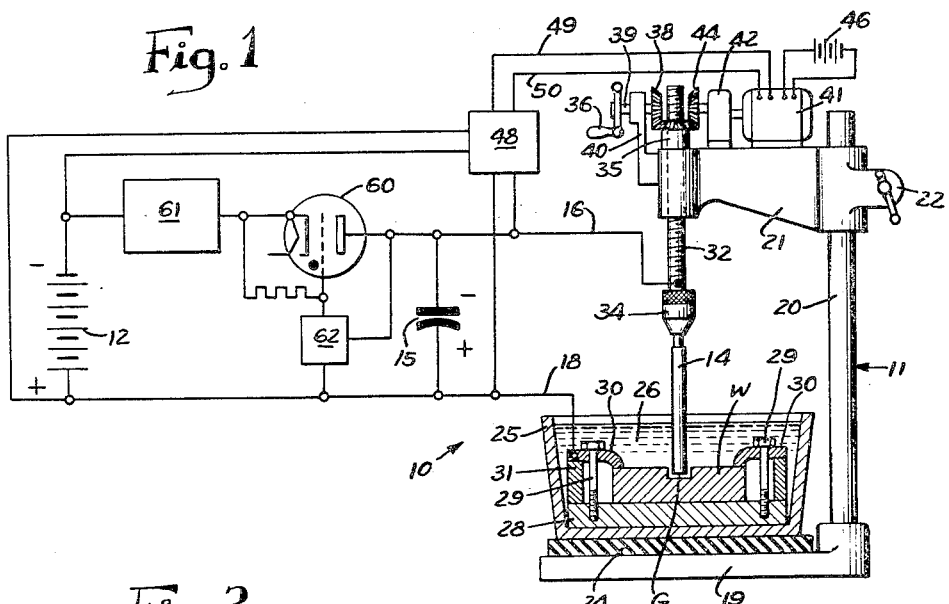
Figure 1 is a view, partly in section and partly in elevation, showing an illustrative spark machining apparatus which embodies the invention, certain portions being represented diagrammatically by labeled rectangles.

While the present invention is susceptible of various modifications and alternative constructions, certain illustrative embodiments thereof have been illustrated in the drawings and will be described below in considerable detail. It should be understood, however, that there is no intention to limit the invention to the specific forms disclosed, but, on the contrary, the intention is to cover all modifications, alternative constructions and equivalents falling within the spirit and scope of the invention as expressed in the appended claims.

Figure 2:
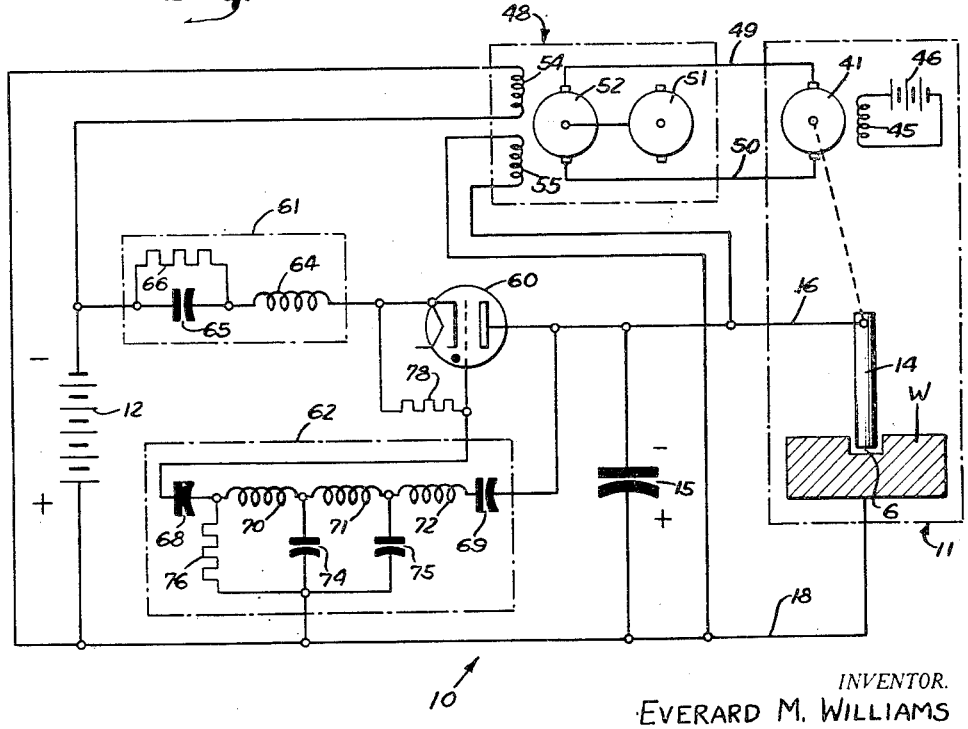
Fig. 2 is a circuit diagram of the apparatus of Fig. 1 and showing the electrode tool and the workpiece diagrammatically.

Referring now in detail to Figs. 1 and 2, it will be perceived that the invention is there exemplified in an illustrative spark machining apparatus 10. The latter comprises a mechanical unit 11, together with certain electrical circuits powered from a direct current source 12. The unit 11 carries a workpiece W and an electrode tool 14 mounted for movement relative to each other and separated by a dielectric filled spark gap G. An energy storage device in the form of condenser 15 is connected across the spark gap between the tool 14 and the workpiece W. The condenser 15 is repetitively charged from the source 12 and discharged across the gap G in accordance with a cycle established by the circuits associated therewith. The tool 14 and the workpiece W are connected in series across the condenser 15 by conductors 16 and 18, the tool being connected to the negatively charged terminal of the condenser and the workpiece W being connected to the positively charged terminal thereof.

The mechanical unit 11 in this instance comprises a base 19 for supporting the workpiece and an upright column 20 carrying a radial arm 21. The latter, which may be adjusted vertically and horizontally by means of clamp 22, has a tool holding and feeding mechanism mounted thereon. The base 19 has a block 24 of electrical insulation thereon, a container 25 of dielectric fluid 26 such as kerosene or transformer oil resting upon the block. A mounting block 28 in the container 25 has the workpiece W secured thereon as by means of clamping screws 29, dogs 30 and spacers 31.

The tool holding and feeding mechanism comprises, in this instance, a vertically disposed, threaded spindle 32 carried by the radial arm 21 and susceptible of vertical sliding movement relative thereto. At its lower end, the spindle 32 terminates in a chuck 34 which holds the electrode tool 14. At any convenient point, for example adjacent the chuck 34, the conductor 16 is connected to the spindle 32 so as to make the tool 14 negative with respect to the workpiece. The spindle 32 makes threaded engagement with an internally threaded bevel pinion 35 which abuts against the top of the arm 21. Rotation of the pinion 35 in one direction serves to raise the spindle 32 and the tool 14, while rotation of the pinion 35 in the opposite direction serves to lower the spindle and the tool.

Feeding of the spindle 32 and the tool 14 may be effected manually by means of a hand crank 36 which drives a pinion 38 disposed in meshed engagement with the teeth of the pinion 35. Both the crank 36 and the pinion 38 are fixed to a stub shaft 39 which happens to be journaled in an upstanding bracket 40 fixed to the outer end of the arm 21.

The feeding mechanism of the apparatus 10 also includes an automatic feed for the spindle 32 and the electrode tool 14. Such an automatic feed may be of any type capable of providing the required degree of precision in its operation, the present invention not being concerned with the details of the feed.

In the present instance, the apparatus 10 is shown with an automatic feed similar to one of those disclosed in copending application Serial No. 254,566, filed November 2, 1951, by Everard M. Williams and Edmund E. Teubner. As shown particularly in Figs. 1 and 2, the automatic feed of the apparatus 10 comprises a reversible motor 41 mounted on the arm 21 and mechanically connected to the adjusting pinion 35 by means of a speed reducer 42 and a bevel pinion 44. Field 45 of the motor 41 is energized from an independent source 46 of direct current power. The armature of the motor 41, on the other hand, is connected to a regulator 48 via conductors 49, 50. The regulator 48 contains an independently driven motor 51 which drives a generator 52 connected across the conductors 49, 50. The generator 52 has opposed field windings 54, 55 which govern the polarity of the generator output applied to the armature of the reversible motor 41. The field 54 is subjected to the constant potential of the direct current source 12, while the field 55 is connected across the conductors 16, 18 and hence subjected to the voltage across the spark gap G. By means of voltage dividers or similar expedients (not shown), the regulator 48 can be calibrated or adjusted to maintain the spark gap G of predetermined length. Any departure of the spark gap from such predetermined length results in an unbalance between the generator fields 54, 55 which affects the output of the generator 52. This change in output is just sufficient to drive the reversible feed motor 41 in the proper direction to restore the predetermined length of spark gap between the tool 14 and the workpiece.

Although both the manual and the automatic feed devices just described effect only translational movement between the tool 14 and the workpiece W, it should be borne in mind that such devices are easily susceptible of imparting rotational movement, or combined rotational and translational movement, between the tool and the workpiece.

Provision is made in the apparatus 10 whereby the condenser 15, after being charged, is isolated from the charging circuit until after the condenser has been discharged and the spark gap deionized. This is accomplished by utilizing a grid-controlled electron-discharge tube as a switch and by providing means for firing or rendering this tube conductive after a predetermined time following the condenser discharge, to reconnect the condenser to the charging circuit. A pulse-forming network is also utilized with the foregoing to provide for deionization of the tube and thereby isolate the condenser from the source prior to the next discharge. Actually, this network first furnishes energy to charge the condenser and then a reverse voltage pulse to extinguish the tube current.

Referring more specifically to Figs. 1 and 2, it will be noted that the condenser 15 is connected with the power source 12 by a charging circuit which includes a gas-filled triode or thyratron tube 60, a pulse-forming network 61, and a delay network 62. The details of the charging circuit will be more easily understood if described in conjunction with the operation thereof, particular reference being made to Fig. 3. Assuming as initial conditions that the condenser 15 is fully charged and that the thyratron 60 is deionized, operation may be initiated by advancing the electrode tool 14 toward the workpiece W until the voltage on the terminals of the condenser 15 is sufficient to break down the dielectric medium in the spark gap G, resulting in a spark discharge across the gap. The condenser voltage thereupon falls to zero and the spark gap G rapidly becomes deionized since it is isolated from the power source 12 by the thyratron 60, the latter being in a nonconductive condition at this particular time.

In order to recharge the condenser 15, it is necessary to fire or cause conduction through the thyratron 60, thereby connecting the condenser to the energy source 12. This is accomplished by the pulse-forming network 61. As shown in Fig. 2, the network 61 comprises an inductor 64 connected in series with a condenser 65 and a resistor 66, both of the latter being connected in parallel. This combination is connected between the cathode of the thyratron 60 and the negative terminal of the power source 12. The condenser 65 is maintained normally discharged by the resistor 66 and the source 12 tends to cause current to flow through the inductor 64 and the condenser 65 to the thyratron 60 and thence through the thyratron to charge the condenser 15. Such current flow cannot take place, however, until the thyratron 60 has been ionized. Suitable voltage for ionization of the thyratron 60 is provided by the delay network 62, which applies a pulse from the previous discharge of the condenser 15 after a predetermined time has elapsed.

The delay network 62 may be any one of a number of types and in this case happens to be a simple simulated transmission line connected between the negative terminal of condenser 15 and the thyratron grid and isolated from steady voltages by blocking condensers 68 and 69. The transmission line is made up of inductors 70, 71 and 72 and condensers 74 and 75 with a resistor 76 at one end to prevent echoes and false triggering. A resistor 78 normally maintains the thyratron grid at the same potential as the cathode thereof, keeping the thyratron deionized. On discharge of the condenser 15 as the electrode tool 14 approaches the workpiece W, the originally negative terminal of the condenser 15 experiences an effective positive increase in its potential by reason of its sudden and complete discharge and a positive impulse is accordingly applied to the thyratron grid after a time depending on the constants of the delay network 62. When the grid voltage rises to the required value above that of the cathode, the thyratron 60 is rendered conductive and a charge is applied to condenser 15 by a current flowing from source 12 through condenser 65, inductor 64 and thyratron 60. As this current flows, charge accumulates on both condensers 15 and 65 until the sum of the voltages of these condensers is equal and opposite to that of the source 12.

After this condition is reached, current continues to flow through the thyratron 60 because eof the effect of the inductor 64. This current flow ceases only when the total voltage across condensers 15 and 65 is opposite to and approximately twice that of source 12. At this time, current flow would reverse through the charging circuit were it not for thyratron 60 which cannot conduct in the reverse direction so that current ceases and the thyratron deionizes. Because the capacitor may lose its charge over periods of non-use of the equipment, the charged condition required for starting may be simply facilitated by directly connecting the negative conductor of the source to the negative electrode of the condenser 15, suitably through a permanently installed high ohmage trickle resistor or the like. The network of the regulating system 48 may also include such a high resistance rate path although, as schematically illustrated, the control field 55 connected across the spark gap would cause a drain and ultimate discharging.

Thee curves of Figure 3 illustrate graphically the circuit changes described above, as near as can be ascertained. Curve A shows how the voltage Ec of condenser 15 falls to zero on the occurrence of a spark discharge between the electrode and the workpiece W. Thereafter, the voltage remains practically zero for a definite period. The initial portion of this period, $t_1$, is attributable to the delay network 61. At the end of the period $t_1$, the positive voltage on the thyratron grid starts to rise as indicated by curve B. After a further time $t_2$, the grid voltage reaches the value necessary to fire the thyratron 60 and plate current flows therethrough as indicated by curve C. This causes the condenser 15 to be recharged rapidly, its voltage rising to its original value as shown by curve A. Deionization of the thyratron 60 follows as explained above, after which the condenser 15 is again discharged across the spark gap between electrode 14 and the workpiece W. This cycle of discharge and recharge continues as long as the spark gap G is small enough to be broken down by the voltage of the condenser 15 when fully charged. The circuit constants, of course, are determined so that the sum of $t_1$ and $t_2$ is ample to permit deionization of the gap after discharge of the condenser 15.

Turning now to Fig. 4, there is shown a modified form of apparatus 10A also illustratively embodying the invention. Since the apparatus 10A bears close similarity to the apparatus 10 described earlier herein, like parts in each apparatus will be designated by the same reference numerals. In general, the apparatus 10A comprises the circuit and mechanical arrangement utilized in the apparatus 10 but has a different energy storage means. Thus, in lieu of a single condenser such as the condenser 15, the apparatus 10A has substituted therefor a pulse-forming network 80 (Fig. 4). When discharged from a given potential, the network 80 is adapted to produce a steep wave front discharge of predetermined amplitude and duration. Moreover, there is no appreciable attenuation of the impulse produced by the network 80 on either charging or discharging.

In this case, the network 80 comprises a relatively large condenser 81, together with two simple oscillatory circuits connected in series therewith. One such circuit comprises an inductor 82 and a condenser 84. Similarly, the other such circuit comprises an inductor 85 and a capacitance 86.

During charging, the flow of current through the inductances 82, 85 is unidirectional and the resultant voltage drop is not sufficient to put much of a charge respectively on condensers 84, 86. These conditions permit charging condenser 81 without oscillation in the circuits 82, 84 or 85, 86. Moreover, the presence of these oscillatory circuits in the charging circuit reduces appreciably the peak of charging current inrush through the thyratron 60, lightening its duty cycle and prolonging its life. Charging of the pulse-forming network 80 is terminated when the potential on its terminals reaches the breakdown potential of the spark gap G.

Upon ionization of the gap G, its impedance drops substantially from infinity to a relatively low value in an infinitesimal amount of time. This causes reversal of the field surrounding the inductors 82, 85 at the expense of a small amount of energy stored in the condenser 81. Because of the extremely rapid rate of current change through the pulse-forming network, the two auxiliary components thereof are thrown into violent oscillation and the end result is a pulse with a steep wave front, referred to above. Due to this extremely steep impulse produced by the network 80, the inherent inductance 88 of the conduit 16 and the inherent inductance 89 of the conduit 18 also contribute toward steepening the wave front and must be taken into consideration in selecting network constants.

After each discharge of the pulse-forming network 80, the delay network 62 allows a predetermined period to elapse before initiating recharge. In this instance, the time delay must be adequate to allow the gap G to deionize and, in the interest of the highest practical repetitive rate, should not be longer than necessary.

I claim as my invention:

1. A high-speed apparatus for machining a conductive workpiece by the electrical dislodgment of particles therefrom, said apparatus comprising, in combination, an electrode tool adapted to be held in spaced relationship to the workpiece, an energy storage device connected between said workpiece and said tool, a gaseous discharge tube and a pulse-forming network connected between said energy storage device and a source of charging power therefor, and a delay network connected across said energy storage device, said delay network being connected to said gaseous discharge tube for rendering the same conductive after a predetermined time delay following discharge of said storage device.

2. A high-speed apparatus for machining a conductive workpiece by the electrical dislodgment of particles therefrom, said apparatus comprising an electrode tool, means for feeding said tool and the workpiece relative to each other to maintain a predetermined spark gap therebetween, means for storing electrical energy, said storage means being connected across said workpiece and said tool, a gaseous triode and a pulse-forming network connected between said energy storage means and a source of charging power therefor, and a delay network connected across said energy storage means, said delay network being connected to the grid of said triode to render the same conductive for recharging the storage means a delayed time after discharge of said storage means through said spark gap.

3. In a high-speed apparatus for machining a conductive workpiece by electrically dislodging particles therefrom, the combination comprising, an electrode tool, an automatic feed for effecting controlled relative movement between said tool and the workpiece to maintain a spark gap therebetween, an energy storage device including a condenser connected between said workpiece and said tool, a gas-filled triode and a pulse-forming network series connected between said energy storage device and a source of charging power therefor, and a simulated transmission line connected across said energy storage device, said simulated transmission line having a connection with said triode for rendering the same conductive to recharge the condenser after a time delay interval following the discharge of said condenser through said spark gap.

4. In an apparatus for cutting a conductive workpiece by electrical dislodgment of particles therefrom, the combination of an electrode tool, means for automatically feeding said tool relative to the workpiece to maintain a spark gap therebetween, a first pulse-forming network connected between the workpiece and said tool, a grid-controlled gaseous discharge tube, a second pulse-forming network, said tube and said second network being connected between said first pulse-forming network and a source of charging current, and a delay network connected across said first pulse-forming network and said grid-controlled discharge tube.

5. A high-speed apparatus for cutting a conductive workpiece by electrical dislodgment of particles therefrom, said apparatus comprising the combination of an electrode tool, means for automatically feeding said tool relative to the workpiece to maintain a predetermined spark gap therebetween, a condenser, a discharge circuit connecting said condenser between the workpiece and said tool, a charging circuit connecting said condenser with a power source, a thyratron tube having a grid, in said charging circuit, a pulse-forming network in said circuit in series with said thyratron tube, and a delay network connected across said condenser and the grid of said thyratron tube for rendering said thyratron conductive for an interval at a predetermined time after discharge of said condenser.

6. A high-speed spark-cutting apparatus comprising, in combination, an electrode tool, means for automatically feeding said tool relative to a conductive workpiece to maintain a spark gap therebetween, a first pulse-forming network, a discharge circuit connecting said first network between the workpiece and said tool, a charging circuit connecting said first pulse-forming network with a source of power, a thyratron tube having a grid and connected in said charging circuit, a second pulse-forming network connected in said charging circuit, and a delay network in the form of a simulated transmission line connected across said first pulse-forming network and also connected with the grid of said thyratron tube for controlling the same.

7. In a spark cutting apparatus for dislodging particles from a conductive workpiece by repetitive time-spaced sparks through an ionizable dielectric medium in the spark gap defined between the workpiece and an electrode tool, means for connecting the spark gap directly across a capacitive energy storage means, a charging circuit including a series connected switching means therein connecting said capacitive storage means to an electrical power source, said switching means being responsive to the charged condition of said capacitive storage means to open said charging circuit, and means responsive to the discharging of the capacitive storage means for closing said switch a delay interval thereafter to permit deionization of said spark gap.

8. In spark machining apparatus for dislodging particles from a workpiece by repetitive over-voltage initiated sparks through an ionizable dielectric medium in a spark gap defined between the workpiece and a tool electrode, a capacitor, a discharge circuit for conductively coupling the spark gap directly across the capacitor, a charging circuit for connecting the capacitor to a voltage source, a discharge device connected in series in said charging circuit to permit flow of charging current into said capacitor, said discharge device being normally conductive until said capacitor is charged, and means responsive to the discharging of the capacitor for maintaining said discharge device non-conductive for a delay interval after said discharge to permit deionization of the spark gap.

9. In spark machining apparatus for dislodging particles from a workpiece by repetitive over-voltage initiated sparks through an ionizable dielectric medium in a spark gap defined between the workpiece and a tool electrode, a capacitor, a discharge circuit for conductively coupling the spark gap directly across the capacitor, a charging circuit for connecting the capacitor to a voltage source, a unidirectionally conducting discharge device having a control electrode, said discharge device being connected in series in said charging circuit to permit flow of charging current until said capacitor is charged, and a time delay circuit coupled to said capacitor and said control electrode responsive to the discharging of the capacitor to maintain said discharge device non-conductive for a delay interval to permit deionization of the spark gap.

References Cited in the file of this patent

UNITED STATES PATENTS

| | | |
|---|---|---|
| 2,179,105 | Sidney | Nov. 7, 1939 |
| 2,235,385 | Rava | Mar. 18, 1941 |
| 2,295,293 | Rogers | Sept. 8, 1942 |
| 2,404,971 | Mahoney et al. | July 30, 1946 |
| 2,405,069 | Touks | July 30, 1946 |
| 2,415,116 | Stiefel | Feb. 4, 1947 |
| 2,451,496 | Klemperer | Oct. 19, 1948 |
| 2,459,858 | Westcott | Jan. 25, 1949 |
| 2,537,990 | Graham | Jan. 16, 1951 |

FOREIGN PATENTS

| | | |
|---|---|---|
| 548,618 | Great Britain | Oct. 16, 1942 |
| 637,793 | Great Britain | May 24, 1950 |